Dec. 14, 1937. G. J. KOPP 2,102,010
PROTECTIVE DEVICE FOR FLEXIBLE CONDUITS
Filed Jan. 2, 1936
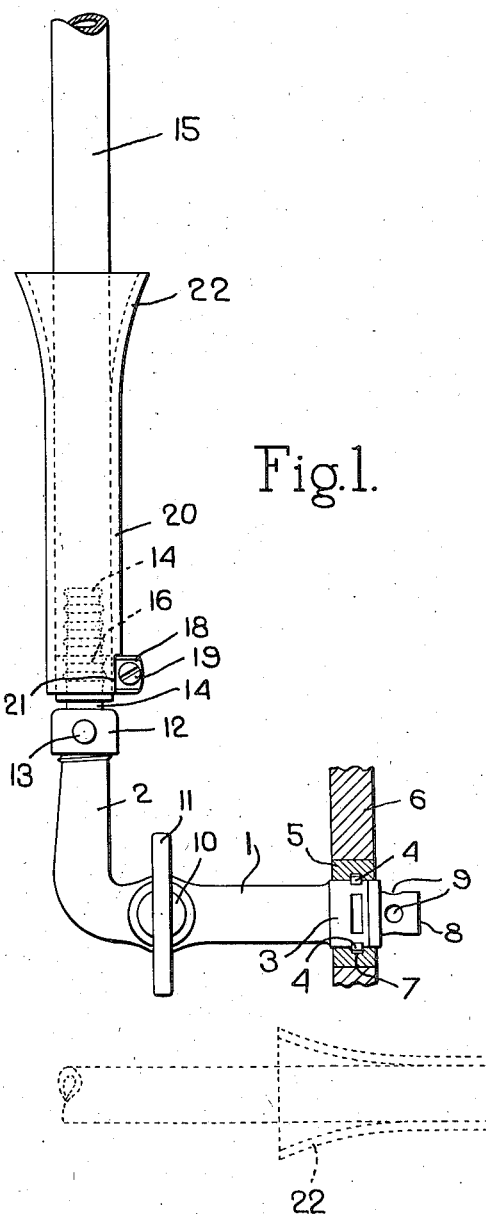
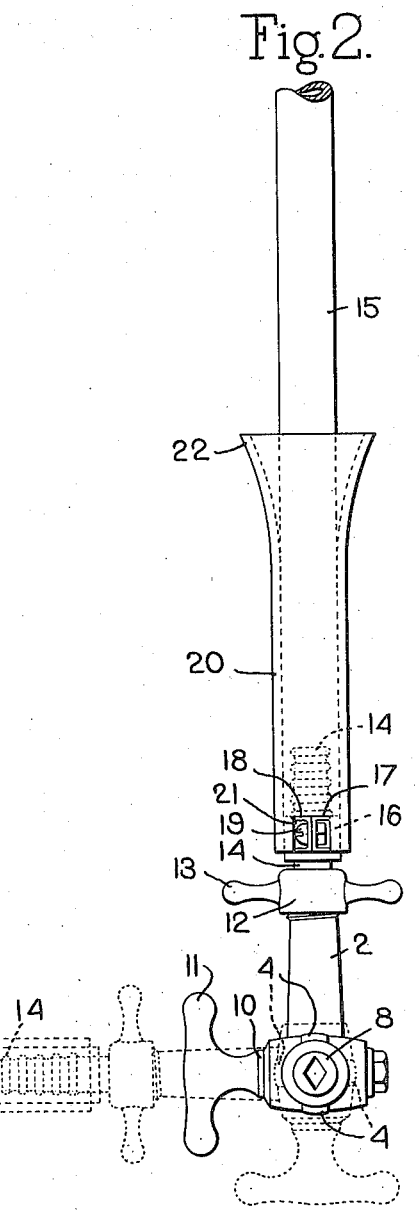
Inventor.
George J. Kopp
by Heard Smith & Tennant.
Attys.

Patented Dec. 14, 1937

2,102,010

UNITED STATES PATENT OFFICE 2,102,010

PROTECTIVE DEVICE FOR FLEXIBLE CONDUITS

George J. Kopp, Allston, Mass.

Application January 2, 1936, Serial No. 57,144

2 Claims. (Cl. 138—61)

This invention relates to improvements in protectors for flexible conduits, such as rubber hose, and the like, and the object thereof is to provide a device which will permit the flexing of the conduit, but which will prevent the conduit from abrupt bending or kinking.

A further object of the invention is to provide a protective device of the character described which will prevent abrupt bending or kinking of a flexible conduit, such as a hose, at or near the coupling of the end thereof to a rigid conduit.

More particularly the invention relates to a protective device for the end portion of a beer hose which is connected to a rigid conduit or fitting, the opposite end of which is connected by a bayonet joint, or otherwise, to a beer barrel or container and which necessitates rotation of the fitting in coupling it to the barrel. In such instances the flexible hose is frequently grasped by the operator in making the connection and bent so abruptly as to collapse or kink the hose and injure it.

A further object of the invention is to provide a protective device which will not only prevent kinking and injury to the hose, but which will also serve as a handle to enable greater power to be applied to the fitting during the coupling operation.

These and other objects and features of the invention will more fully appear from the following description and the accompanying drawing and will be particularly pointed out in the claims.

In the drawing:

Fig. 1 illustrates a hose having its end coupled to a rigid conduit or fitting, the opposite end of which is connected by a bayonet joint to the wall of a container, such as a beer barrel which is shown in section; and, Fig. 2 is an elevation of the same viewed from the right toward the left, and illustrating also in dotted lines the position of the fitting and coupling as the fitting is applied to the barrel in horizontal position and thereafter moved to vertical position to complete the coupling and to place the parts in normal operative position.

An illustrative embodiment of the invention is shown in the accompanying drawing as applied to the coupling between a flexible beer hose and the fitting which enters and is secured to a beer barrel, or other container.

The beer hose which leads from the fitting to the cooling coils of the dispensing apparatus, or to the dispensing faucets, is usually of special rubber composition which does not contain ingredients which will impart an undesirable taste to the beer. Such hose is made in Germany and is of an expensive character so that the replacement of injured hose is costly. Injury to hose of this character is usually produced by careless manipulation by the operator when coupling the hose fitting to the barrel or container as the fitting and barrel are usually provided with complementary bayonet joint connections which require the rotation of the fitting through an arc of approximately ninety degrees and the operator frequently will seize the hose near the coupling either because it is somewhat larger and more easily grasped, or because it will afford a greater leverage and in thus manipulating the hose will bend it abruptly so that it eventually will become collapsed or kinked.

The specific object of the invention is to provide a protective device which will avoid injury to the hose when such coupling is made by the operator and also will avoid abrupt bending of the hose or kinking thereof when the hose is of greater length than is required to extend to the cooling coils or faucets. The protective device embodying the invention, however, is of greater utility and may be applied to a desired section of any conduit or hose to prevent abrupt bending thereof, or if the conduit or hose has been abruptly bent and somewhat weakened to prevent further injury to it which would render it less efficient or useless.

In the construction illustrated in the drawing the fitting comprises a metal pipe or conduit, of L-shape, having a horizontal section 1, and an integral vertical section 2, the horizontal section 1 having near its end an enlarged portion 3 having an interrupted screw thread providing fins 4 adapted to be inserted through a socket member 5 in the wall 6 of a beer barrel or container and adapted to engage complementary recesses 7 in the socket member 5. The end of the fitting may have a reduced end portion 8 having lateral ports 9 to permit the fluid to enter the fitting. The fitting is provided with a cock 10 having the usual handle 11. The opposite section 2 of the fitting is screw threaded near its end and is provided with an internally screw threaded union 12 having handles 13 adapted to engage the flanged end of a nipple 14 which, when the union 12 is screwed up, will hermetically connect the nipple to the end of the fitting.

The beer hose 15 which, as above stated, is of high grade rubber composition, telescopically fits upon the opposite end of the nipple 14, and is secured thereto by a clamping ring 16 having parallel outwardly extending end portions 17 and 18 which when clamped together by the bolt 19 fixedly secures the end of the hose upon the nipple.

The protective device embodying the present invention comprises a tubular member or sleeve 20 which slidably fits upon the hose 15 and extends over the coupling ring 16. The lower end portion of the protective device desirably is provided with a recess or slot 21 which enables the protective device to be forced downwardly a sufficient distance to enclose the telescoping portions of the hose and nipple.

The protective device desirably is of cylindrical form and fits tightly upon the hose for a substantial distance from the coupling and thence diverges from the hose providing a bell-mouthed portion 22 which will permit substantial flexure of the hose, but will prevent such abrupt bending as to kink or otherwise restrict the hose. For example, if the hose for the protective device were coupled directly to the fitting and the hose were of substantially greater length than necessary, the weight of the hose together with that of the liquid contained therein would cause an abrupt bending of the hose at or near the coupling which would partially collapse the hose or kink it, thereby rendering it inefficient and eventually cause a rupture of the hose at the abrupt bend. The kinking or restricting of the hose by an abrupt bend when used to convey beer or other carbonated beverages is likely to produce foaming of the liquid so that it is improperly delivered from the faucet. By reason of the present invention such injury or decrease in the efficiency of the hose is avoided.

The protective device 20 is of rubber composition having some flexibility, but of greater rigidity than the hose or conduit which it surrounds and tightly fits. The inner surface of the protective device, being of rubber, frictionally engages and adheres to the outer surface of the rubber beer hose, and thereby reenforces and strengthens it at and beyond the coupled portion, while the bell-mouthed end portion which is well beyond the end of the coupling prevents abrupt bending of the hose. Desirably it is of sufficient strength to afford a handle which may be grasped by the operator when the fitting is inserted in the barrel and employed to assist in turning the fitting from horizontal to vertical position without injury to the hose.

While the protective device is particularly described herein with reference to its application to couplings between the flexible hose or conduit and a rigid conduit, it may also be employed to reenforce any section of a hose or conduit which may be subject to abrupt bending or to reenforce a section of the hose or conduit which has been or may be weakened by bending.

It will therefore be understood that the particular embodiments of the invention shown and described herein are of an illustrative character and not restrictive of the meaning and scope of the following claims.

Having thus described the invention, what is claimed as new, and desired to be secured by Letters Patent, is:

1. A protector for a highly flexible rubber beer hose, having one end telescopically connected to the end of a rigid fitting, comprising a seamless tubular sleeve of elastic rubber composition of much greater rigidity than said hose closely fitting, frictionally engaging and adhering to the telescoping end portion of the hose and a substantial portion thereof beyond the coupling thereby reenforcing the coupled end portion of the hose, then flaring outwardly to present a bell-mouthed end operable to prevent abrupt bending or kinking of the hose while permitting the hose to flex in a curve which will not be injurious to the material of the hose.

2. A protector and handle for a highly flexible beer hose, having one end telescopically connected to the end of a rigid L-shaped fitting provided with a bayonet connection at its other end to a beer barrel comprising a seamless hose of elastic rubber composition closely fitting, frictionally engaging and adhering to the telescoping end portion of the hose and a substantial portion thereof beyond the coupling and then flaring outwardly to present a bell-mouthed end, said protector being of sufficiently greater rigidity than the hose to provide a handle for manipulating the fitting when making the bayonet connection thereof to a barrel and also acting to prevent abrupt bending of the hose at or adjacent to the connection of said fitting.

GEORGE J. KOPP.